L. S. BACHE.
THRUST BEARING.
APPLICATION FILED MAR. 17, 1914.

1,174,941.

Patented Mar. 7, 1916.

WITNESSES

INVENTOR
Leigh S. Bache,
BY
ATTORNEY

UNITED STATES PATENT OFFICE.

LEIGH S. BACHE, OF BOUNDBROOK, NEW JERSEY, ASSIGNOR TO THE GRAPHITE LUBRICATING COMPANY, OF BOUNDBROOK, NEW JERSEY, A CORPORATION OF NEW JERSEY.

THRUST-BEARING.

1,174,941.      Specification of Letters Patent.      Patented Mar. 7, 1916.

Application filed March 17, 1914. Serial No. 825,357.

*To all whom it may concern:*

Be it known that I, LEIGH S. BACHE, a citizen of the United States, and a resident of Boundbrook, in the county of Somerset and State of New Jersey, have invented certain new and useful Improvements in Thrust-Bearings, of which the following is a full, clear, and exact description, whereby any one skilled in the art may make and use the same.

The invention relates to thrust bearings and more particularly to a bearing of the self-lubricating type, that is, a bearing in which oil may be used but in which it is not necessary and essential.

The invention relates more specifically to a bearing formed of suitable material, preferably bronze, with a composition of graphite inserted therein to provide for lubricating the surfaces of the bearing and the bearing members which are to be lubricated.

Where bronze or any of the softer metals are used, such as are commonly employed for bearings, there is a tendency for the filling of graphite or other lubricating material to chip out and work loose, particularly where the bearing members are of thin material and subject to strain and warpage. For instance, in thrust washers and thrust bearing surfaces, where there is a considerable strain thrown upon the bearing parts, the lubricating bearing must be made unusually heavy in order to support the graphite or other lubricating material to prevent any possible distortion which will dislodge the lubricant.

It is also very important to provide for lubricating the entire surface of the metal and in order to arrange a sufficient quantity of the lubricant in the metal portion of the bearing, said metal portions have usually been of unusual and often of prohibitive weight to provide for the necessary strength of metal, so that there will be no undue weakening when cut away for the lubricating filling.

It is the object of the present invention to provide an arrangement of the lubricating material and metal so disposed as to give a maximum lubrication to all parts with a maximum of strength for any given size of part.

It is also an object of the invention to provide the lubricating elements of the bearing so that they will be interlocked by continuous bodies of the lubricant.

Figure 1:
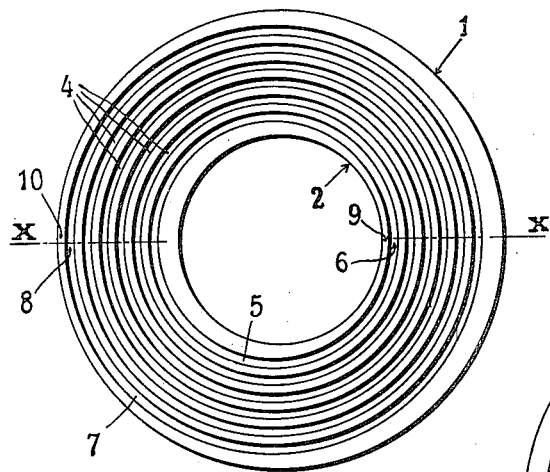
Figure 2:
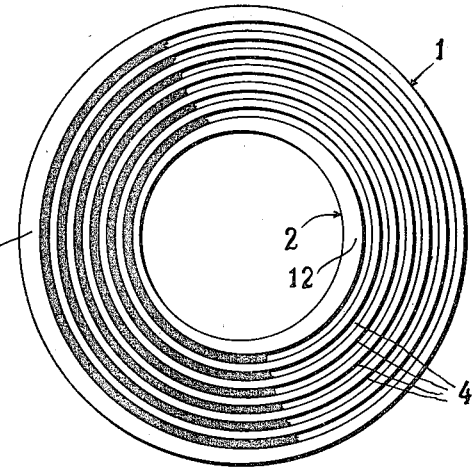
Figure 5:
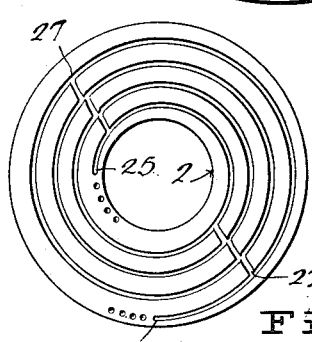
Figure 3:
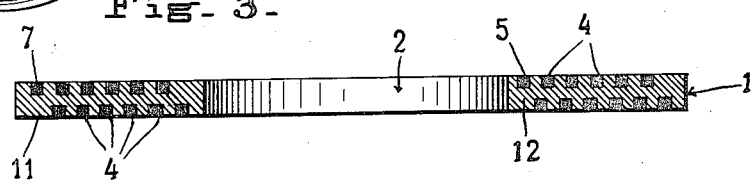
Figure 4:
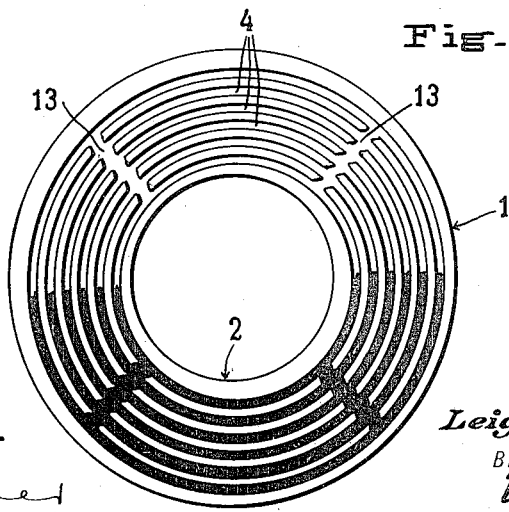

Referring to the drawings: Figure 1 is a front face view of a thrust washer. Fig. 2 is a rear face view of the washer shown in Fig. 1. Fig. 3 is a sectional view on the line $x$—$x$ of Fig. 1. Fig. 4 is a front face view of the washer illustrated in Fig. 1, showing the interlocking bars of lubricant. Fig. 5 illustrates a modified form of groove.

In the illustration of the invention shown in the drawings, a thrust washer embodying the invention is shown. In order to provide self-lubricating washers, such as illustrated, or bearings embodying a thrust bearing and maintain sizes of sufficiently small dimensions, great difficulty has been experienced in holding a sufficient quantity of graphite or lubricating material to effectually lubricate the entire surface of the metal. This is particularly true where washers are employed which must be lubricated as to both surfaces and heretofore, in order to hold a sufficient quantity of lubricating material in the pockets or recesses formed in such washers, it has been necessary to form the pockets by piercing through the washer or by making the metal portion of the washer of unusual thickness.

The first method, of providing perforations extending through the washer, is very unsatisfactory as the lubricating material is liable to be displaced and forced back and forth in the perforations to such an extent that it is loosened and works out. A second method has its obvious disadvantage of making it impossible to use the self-lubricating washer or bearing in many instances where close work and comparatively small parts are required.

As hereinafter described, the present invention contemplates arranging the lubricating material in recesses or grooves in the opposite faces of a thrust washer in such relation to each other and in such relation to the metal body-part of the washer that the lubricant will be wiped over the entire metal surface at each revolution and the material will be backed up by solid metal.

Referring to Figs. 1 to 4, there is illustrated in Fig. 1 a washer having a metal body-part 1 with a central concentric aperture 2 and a series of grooves 4 formed eccentrically to the central axis of the washer. These grooves are so disposed that the innermost one 5 approaches the perforation 2 very closely at one side as at 6. As the various grooves are concentric with reference to each other, the outermost groove 7 approaches very closely to the peripheral edge of the washer at a point 8 which is substantially diametrically opposite the point 6. This arrangement leaves a comparatively light face of solid metal adjacent to the perforation as at 9 and a similar body of metal at the outer peripheral edge of the washer as at 10.

It will be obvious, that with the grooves filled with a suitable lubricant such, for instance, as graphite, the rotating part bearing against the face of the washer and being concentric with it will carry the lubricant from the eccentric grooves across the metal portions, giving a thin film of lubricant to every portion of the metal surface. It is apparent that taking any given point on the metal surface and moving it concentrically of the washer, that it will pass through at least two lines of eccentrically disposed graphite and in so doing will travel along the graphite surface for a considerable distance, thus there is a maximum surface of the graphite available for each moving point of the metal which abuts against the washer and the metal of the washer will itself be lubricated by the carrying over of the film of graphite. The opposite face of the washer where both sides are lubricated, is in the exact reverse to the arrangement of the front face of Fig. 1 as is clearly illustrated in Fig. 2.

In Fig. 2 the rear face of the washer of Fig. 1 is shown and illustrates a solid body of metal adjacent to the peripheral edge as at 11 which is directly in the rear of the groove 7 of the front face. Likewise, there is a solid body of metal adjacent to the perforation 2 as at 12 which is directly in back of the groove 6. It is apparent that this arrangement gives an offset for the grooves on opposite sides of the washer so that there will be a maximum body of metal backing up each groove. This is well illustrated in the sectional view of Fig. 3. Such an arrangement has particular advantages. The moving parts, instead of crossing abruptly from metal to graphite and graphite to metal, move smoothly along the field of the graphite and onto the metallic field with a wiping or sweeping action which does not tend to displace the graphite. Furthermore, any cramping or binding at one side of the washer producing a tendency to disrupt the graphite will not be transmitted to the opposite side and produce disturbing influences on the graphite held in the opposed grooves. Where perforations are formed directly through the washer, this condition is an inherent objection, as any disturbing influence on one side will force and influence the graphite at the opposite side.

There is another advantage in the arrangement of the eccentric grooves. It makes it possible to lubricate the metal clear up to the periphery of the bearing and to the extreme edge of the perforation.

In Fig. 4, the same arrangement is illustrated as in Figs. 1 and 2. In this figure, however, the annular metallic portions intermediate the grooves 4 are broken down to provide grooves or channels 13 which may be disposed in any desired number but are preferably arranged radially of the bearing surface. The object and advantage of these channels is to firmly cement together the entire body of graphite and incidentally provide a greater body of graphite and a larger graphite surface.

Where the graphite is arranged in the individual grooves, variations in coefficient of expansion sometimes tends to work the graphite in as much as each individual section or ring of graphite is backed up on all sides by metal.

Breaking through the metallic bars or rings and forming the channels 13, bodies of graphite are interposed between the adjacent rings and therefore the whole body of graphite may accommodate itself to the slight displacement of the metal rings due to expansion and contraction.

It is apparent that the exact arrangement of grooves may be varied to suit the exigencies of any particular case, although it is essential that where the lubricating material is applied to opposite faces of the same body of metal that grooves be generated from points having opposite eccentricity with reference to the axis of the bearing.

In Fig. 5, there is illustrated in lieu of the continuous closed eccentric groove, a spiral eccentric groove which begins adjacent to the perforation 2 as at 25 and gradually increasing convolutions extend to the peripheral edge as at 26. This gives a continuous body of graphite but the various convolutions may be joined together by breaking down the metal between the grooves to form radial connecting channels as at 27. At both ends 25, 26 of the groove and in continuation thereof are isolated pockets 28.

What I claim as my invention and desire to secure by Letters Patent is:

1. A bearing consisting of a disk-like member having a central opening for a shaft and provided upon its face with grooves, a lubricant filling said grooves, and radially disposed channels connecting the successive grooves, said channels being filled with the lubricant.

2. A bearing comprising a disk-like member having a central perforation for a shaft, a series of concentric grooves in both sides of the disk, each series arranged eccentrically with reference to the axial center of said disk-like member and each series diametrically eccentric to the other, and a lubricating material filling said grooves.

3. A thrust bearing comprising a disk-like member having a central perforation for a shaft, a series of eccentrically arranged grooves on each side of said disk, the eccentricity of one series of grooves being diametrically opposite that of the other series of grooves, a plurality of radial channels connecting all of the grooves of each series and a lubricant filling all of the grooves and channels of each series, whereby the lubricating grooves on opposite faces of the plate are staggered with reference to each other.

4. A thrust bearing consisting of a disk-like member having a central perforation for a shaft, eccentric grooves on opposite sides of said plate, generated from diametrically opposite sides of the axis of the plate, radial channels interconnecting the grooves on each side of the plate and isolated pockets formed in continuation of the extreme end of the eccentric grooves on opposite sides of the plate and a lubricant filling said grooves, channels and pockets.

5. A bearing consisting of a disk-like member provided upon one face with a series of concentric grooves generated from a point eccentric to the axial center of the disk, grooves upon the opposite face of said disk similarly arranged with their axes of generation at a point diametrically opposite the axes of generation of grooves at the opposite side of said disk and a lubricant filling said grooves.

6. A bearing consisting of a disk-like member provided upon one face with a series of concentric grooves generated from a point eccentric to the axial center of the disk, grooves upon the opposite face of said disk similarly arranged with their axes of generation at a point diametrically opposite the axes of generation of grooves at the opposite side of said disk, transverse channels connecting the series of grooves of each face of the disk and a lubricant filling said grooves and channels.

LEIGH S. BACHE.

Witnesses:
  S. A. KING,
  L. V. ROUSSEAU.